United States Patent [19]

Abdulally

[11] Patent Number: 4,955,295

[45] Date of Patent: Sep. 11, 1990

[54] METHOD AND SYSTEM FOR CONTROLLING THE BACKFLOW SEALING EFFICIENCY AND RECYCLE RATE IN FLUIDIZED BED REACTORS

[75] Inventor: Iqbal F. Abdulally, Randolph, N.J.

[73] Assignee: Foster Wheeler Energy Corporation, Clinton, N.J.

[21] Appl. No.: 395,864

[22] Filed: Aug. 18, 1989

[51] Int. Cl.$^5$ .............................................. F23D 1/00
[52] U.S. Cl. .................................. 110/263; 110/245; 110/347; 122/4 D; 431/7; 431/170
[58] Field of Search ............... 122/4 D; 110/245, 263, 110/347, 233; 431/7, 170; 422/139

[56] References Cited

U.S. PATENT DOCUMENTS 4,419,965 12/1983 Garcia-Mallol et al. .
4,604,972 8/1986 Difonzo et al. .
4,781,574 11/1988 Taylor .
4,813,479 3/1989 Wahlgren ..................... 165/104.16
4,860,694 8/1989 Walker .......................... 122/4 D Primary Examiner—Edward G. Favors
Attorney, Agent, or Firm—Marvin A. Naigur; Warren B. Kice

[57] ABSTRACT

A system and method for controlling the sealing efficiency and recycle rate in a fluidized bed reactor in which air is introduced into two chambers found in a sealing vessel for receiving the separated solids from the separator. The air is introduced into two chambers in the sealing vessel in a direction opposite to that of the flow of the separated solids through the vessel. One of the chambers is located below the separator dipleg and in alignment therewith and the other chamber surrounds the first chambers. The air flow through each path can be separately adjusted as necessary.

6 Claims, 1 Drawing Sheet

METHOD AND SYSTEM FOR CONTROLLING THE BACKFLOW SEALING EFFICIENCY AND RECYCLE RATE IN FLUIDIZED BED REACTORS

BACKGROUND OF THE INVENTION

This invention relates to a fluidized bed reactor and more particularly, to a method and system for eliminating gas backflow in the solids recycle system of a fluidized bed reactor.

Fluidized bed reactors, such as gasifiers, steam generators, combustors, and the like, are well known. In these arrangements, air is passed through a bed of particulate material, including a fossil fuel such as coal and an adsorbent for the sulfur generated as a result of combustion of the coal, to fluidize the bed and to promote the combustion of the fuel at a relatively low temperature. The entrained particulate solids are separated externally of the bed and recycled back into the bed. The heat produced by the fluidized bed is utilized in various applications which results in an attractive combination of high heat release, high sulfur absorption, low nitrogen oxides emissions and fuel flexibility.

The most typical fluidized bed reactor is commonly referred to as a "bubbling" fluidized bed in which the bed of particulate material has a relatively high density and a well-defined, or discrete, upper surface.

In an effort to extend the improvements in combustion efficiency, pollutant emissions control, and operation turndown afforded by the bubbling bed, a fluidized bed reactor has been developed utilizing a "circulating" fluidized bed process. According to this process, the fluidized bed density is well below that of a typical bubbling fluidized bed, the air velocity is greater than that of a bubbling bed and the flue gases passing through the bed entrain a substantial amount of particulate solids and are substantially saturated therewith.

Also, the circulating fluidized bed is characterized by relatively high solids recycling which makes it insensitive to fuel heat release patterns, thus minimizing temperature variations and, therefore, decreasing the nitrogen oxides formation. Also, the high solids recycling improves the efficiency of the mechanical device used to separate the gas from the solids for ensuring high solids recycle. The resulting increase in sulfur adsorbent and fuel residence times reduces the adsorbent and fuel consumption. To accomplish this it is necessary to have a loop seal device that does not restrict the flow of solids or reduce collection efficiency. In other situations or designs, such as for high ash fuels, it may be necessary to effect the collection efficiency by passing air/gas flow upwards to a dip leg extending from the separator device.

Most of the circulating bed designs currently being utilized control load by regulating the solids recycle rate and some approach this by reducing the solids inventory from the loop seal, i.e., from the sealing system located between the outlet of the external separating devices and the recycle inlet to the fluidized bed. However, this normally has to be accomplished with a metering cooler, such as a water cooled screw to remove solids from the recycle system, which adds mechanical complexity and costs penalties in addition to requiring downstream handling equipment.

In U.S. Pat. No. 4,781,574 issued Nov. 1, 1988, and assigned to the assignee of the present invention, the above problems were addressed by disposing an air source at the separated solids outlet of a cyclone separator and discharging air into the separator in a direction opposite the direction of flow of the separated solids. The air entrains a portion of the solids and is passed back through the separator and to the heat recovery area Although this technqiue enabled the solids inventory to be controlled without incurring significant additional costs, it interfered with the operation of the separator.

SUMMARY OF THE INVENTION

It is therefore an object of the present invention to provide a method and system for controlling the collection efficiency and the recycle rate in a fluidized bed system.

It is a further object of the present invention to provide a system and method of the above type in which the recycle rate can be increased to a relatively high value and decreased to a relatively low value as desired.

It is a further object of the present invention to provide a method and system of the above type in which a metering device and downstream handling equipment is avoided.

It is still a further object of the present invention to provide a system and method of the above type in which solids inventory control is accomplished internally to the fluidized bed system.

It is a still further object of the present invention to provide a system and method of the above type in which operation of the cyclone separator under certain selected operating parameters is not materially affected.

Toward the fulfillment of these and other objects, air is introduced into two chambers formed in a sealing vessel for receiving the separated solids from the separator. The air is introduced into the chambers in a direction opposite to that of the flow of the separated solids through the vessel. One of the chambers is located below the separator dipleg and in alignment therewith and the other chamber surrounds the first chamber. The air flow through each path can be separately adjusted as necessary.

BRIEF DESCRIPTION OF THE DRAWINGS

The above brief description as well as further objects, features and advantages of the method of the present invention will be more fully appreciated by reference to the following detailed description of the presently preferred but nonetheless illustrative embodiments in accordance with the present invention when taken in conjunction with the accompanying drawings in which.

DESCRIPTION OF THE PREFERRED EMBODIMENTS

Figure 1:
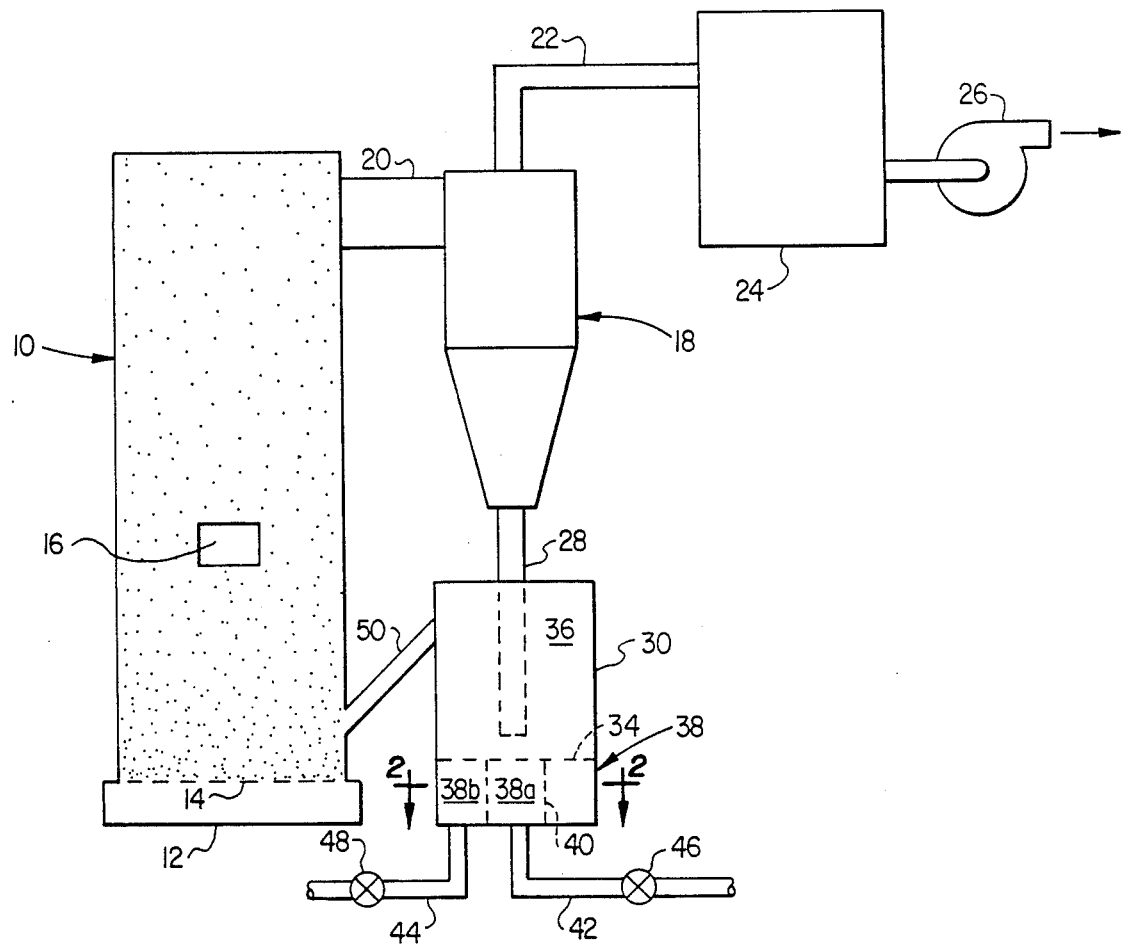
FIG. 1 is a schematic view of the system of the present invention.

Referring specifically to the drawing, the reference numeral 10 refers, in general, to the fluidized bed reactor vessel in which a plenum 12 is disposed at its lower portion for receiving air or gas from a source (not shown) such as a source located externally of the vessel. A perforated plate or grate 14 is provided at the interface between the lower end of the vessel 10 and the air plenum 12 for allowing the pressurized air or gas from the plenum to pass upwardly through the vessel 10. An inlet, or feeder, 16 is provided through one of the sidewalls of the vessel 10 for introducing a particulate material into the bed which can include relatively fine particles of fuel, such as coal, and an adsorbent material, such as limestone, for adsorbing the sulfur generated during the combustion of the fuel in a known manner. The air or gas from the plenum 12 fluidizes the particulate material in the vessel 10 and combines with the gaseous products of combustion to form flue gases as will be described in detail later.

A cyclone separator 18 is provided adjacent the vessel 10 and is connected thereto by a gas channel 20 which extends from an opening formed in the upper portion of the vessel rear wall to a inlet opening formed in the upper portion of the separator 18. The separator 18 receives the flue gases and entrained particulate material from the fluidized bed in the vessel 10 and operates in a conventional manner to disengage the particulate material from the flue gases due to the forces created in the separator.

The separated flue gases pass, via a duct 22, into a heat recovery area shown in general by the reference numeral 24 under the action of an induced draft fan 26 connected to the downstream end of the heat recover area. The separated solids from the separator 18 pass into a dipleg 28 connected to the outlet of the separator.

Figure 2:
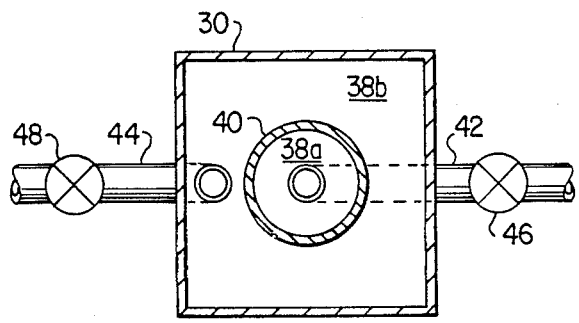
FIG. 2 is an enlarged cross sectional taken along the line 2—2 of FIG. 1.

A seal vessel 30 is disposed below the separator 18 and adjacent the vessel 10 and receives the dipleg 28. A grate 34 is disposed in the lower portion of the vessel 30 to divide same into an upper chamber 36 for receiving the separated solids from the dipleg and a lower chamber 38. As shown in FIGS. 1 and 2, a cylindrical partition 40 is disposed in the chamber 38 to divide it into a central plenum 38a extending just below the dipleg 28, and a plenum 38b surrounding the central plenum. Conduits 42 and 44 are connected to the plenums 38a and 38b, respectively, for introducing air or gas from a source (not shown), such as a source located externally of the vessel 10. The air or gas passes upwardly through the rate 36 to fluidize the separated material in the upper chamber as will be described.

Valves 46 and 48 are provided in the conduits, 42 and 44, respectively, for controlling the flow rate of the air or gas passing therethrough. A duct 50 connects the vessel 30 to the vessel 10 so that the particulate material from the vessel 28 passes into the interior of the vessel 10 and into the fluidized bed formed therein.

In operation, particulate fuel material from the inlet 16 is introduced into the vessel 10 and adsorbent material can also be introduced in a similar manner as needed. Pressurized air or gas passes into and through the air plenum 12, through the grate 14 and into the particulate material in the vessel 10 to fluidize the material.

A lightoff burner (not shown) or the like is disposed in the vessel 10 and is fired to ignite the particulate fuel material. When the temperature of the material reaches a relatively high level, additional fuel from the inlet 16 is discharged into the vessel 10.

The material in the vessel 10 is self-combusting by the heat in the vessel and the mixture of air and gaseous products of combustion (hereinafter referred to as "flue gases") pass upwardly through the vessel 10 and entrain, or elutriate, the relatively fine particulate material in the vessel. The velocity of the air or gas introduced, via the air plenum 12, through the grate 14 and into the interior of the vessel 10 is established in accordance with the size of the particulate material in the vessel so that a circulating fluidized bed is formed in each chamber, i.e., the particulate material is fluidized to an extent that substantial entrainment or elutriation of the particulate material in the bed is achieved. Thus, the flue gases passing into the upper portion of the furnace are substantially saturated with the particulate material. The saturated flue gases pass to the upper portion of the vessel and exit into the duct 20 and pass into the cyclone separator 18. In the separator 18, the solid particulate material is separated from the flue gases and the former is injected, via the dipleg 28, into the sealing vessel 30. The cleaned flue gases from the separator 18 exit, via the duct 22, to the heat recovery section 24 for further treatment.

Air or gas is injected, via the conduits 42 and 44, into the chambers 38a and 38b and passes through the grate 34 to slightly fluidize the separated solids in the vessel 28. From the vessel 30, the separated fluidized solids normally pass, via the duct 50, through the rear wall of the vessel 10 and into the other fluidized bed in the vessel where they mix with the other solids in the vessel.

The flow of air or gas into the chambers 38a and 38b can be regulated by the valves 46 and 48, respectively, to regulate the flow of separated solids from the cyclone 18, through the vessel 30 and into the vessel 10 while sealing against the backflow of flue gases from the vessel 10 through the conduit and into the separator 18 in a direction opposite from the normal system flow described above. The air or gas flow into the plenum 38a can be regulated by the valve 42 independently of the flow into the plenum 38b so that an increase in the air or gas flow into the plenum 38a relative to that into the plenum 38b will decrease the recycle rate and, similarly, a decrease in the air or gas flow into the plenum 38a relative to that in the 38b will increase the recycle rate. Also, the air or gas flow into the chamber 38a can be carefully controlled so as not to interfere with or affect the operation of the separator 18. Thus, by varying the opening of the valves 46 and 48, the solids injection into the vessel 10 from the separator 18 can be indirectly controlled as needed to regulate the recycle rate according to the particular load desired. This enables the load of the reactor to be varied without the use of expensive complex metering devices and downstream handling equipment and thus considerably reduces the costs of the system.

It is understood that the foregoing description relates to balanced draft system but that forced draft operation could be utilized by pressurizing the air or gases entering the conduits 42 and 44.

Other modifications, changes, and substitutions are intended in the foregoing disclosure, and, in some instances, some features of the invention will be employed without a corresponding use of the other features. Accordingly, it is appropriate that the appended claims be construed broadly and in a manner consistent with the scope of the invention therein.

What is claimed is:

1. A fluidized bed combustion system including separating means for receiving a mixture of flue gages and entrained particulate material from fluidized bed and separating said entrained particulate material from said flue gases, means for passing said separated flue gases from said separating means to a heat recovery unit, a seal vessel, a dipleg for passing said separated material from said separating means to said seal vessel, means for passing said separated material from said seal vessel back to said fluidized bed, and means for introducing air or gas to said seal vessel for fluidizing the separated material in said seal vessel to seal against the backflow of said separated material from said fluidized bed, through said dipleg and back to said separating means, said air introducing means comprises a first conduit for introducing air or gas into said seal vessel in a path aligned with the flow path of said separated material from said dipleg, and a second conduit for introducing air or gas into an area of said seal vessel surrounding the flow path of air or gas from said first conduit.

2. The system of claim 1 further comprising means for introducing fluidizing air or gas to said bed at a velocity sufficient to form a circulating bed.

3. The system of claim 1 further comprising means for independently regulating the air or gas flow into said first and second conduits to control the rate of separated material passed back to said fluidized bed.

4. A method of controlling a fluidized bed combustion system comprising the steps of receiving a mixture of flue gases and entrained particulate material from a fluidized bed, separating said entrained particulate material from said flue gases, passing said separated flue gases from said separating means to a heat recovery unit, passing said separated material from said separating means to a seal vessel, passing said separated material from said seal vessel back to said fluidized bed, introducing air or gas to said seal vessel for fluidizing the separated material in said seal vessel to seal against the backflow of said separated material from said fluidized bed to said separating means, said step of introducing comprising the steps of introducing air or gas into said seal vessel in a path aligned with the flow path of said separated material to said seal vessel and introducing air or gas into an area of said seal vessel surrounding said path.

5. The method of claim 4 further comprising the step of introducing fluidizing air or gas to said bed at a velocity sufficient to form a circulating bed.

6. The system of claim 4 further comprising the step of independently regulating the air or gas flow into said path and into said area to control the rate of separated material passed back to said fluidized bed.

* * * * *